Aug. 28, 1928.

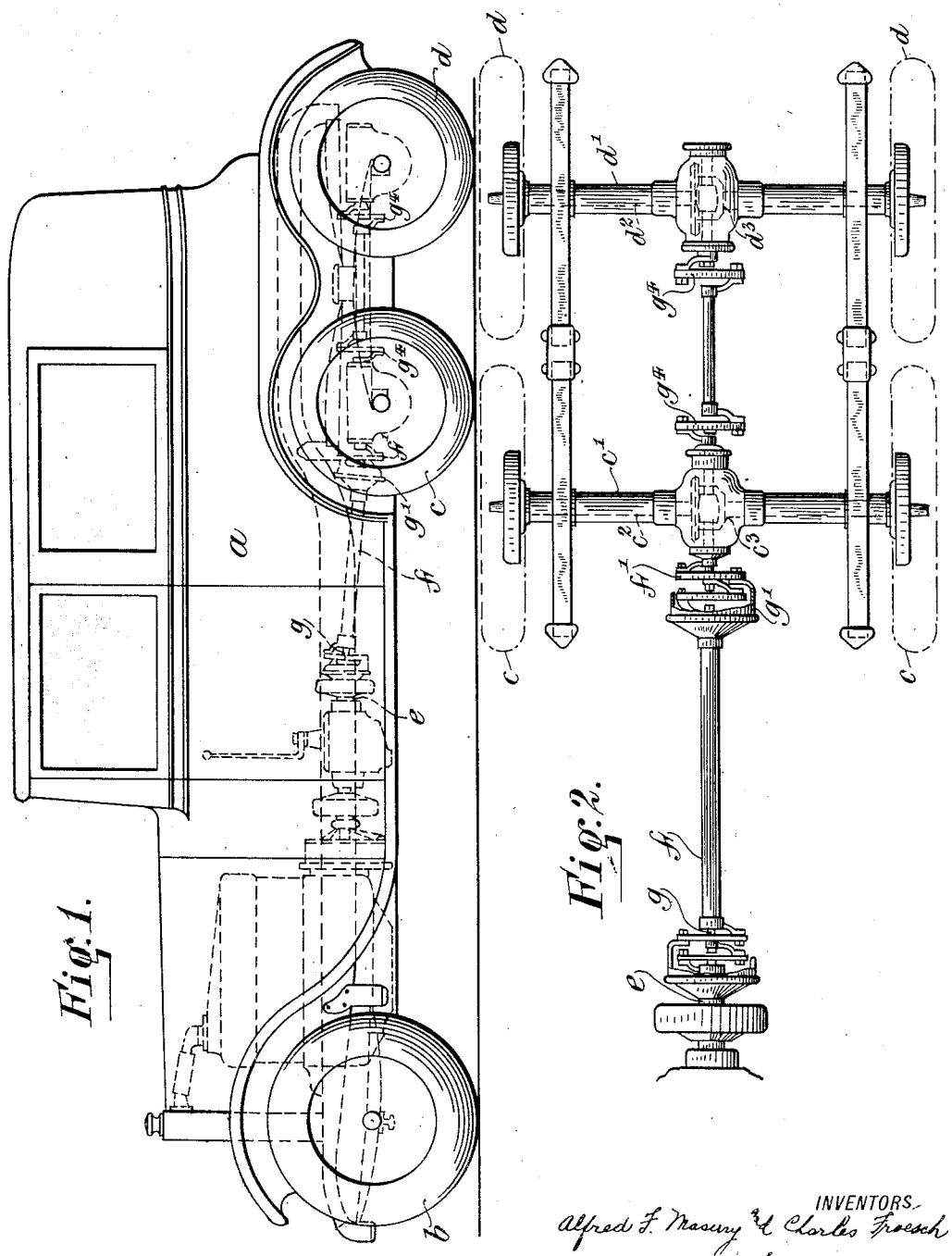

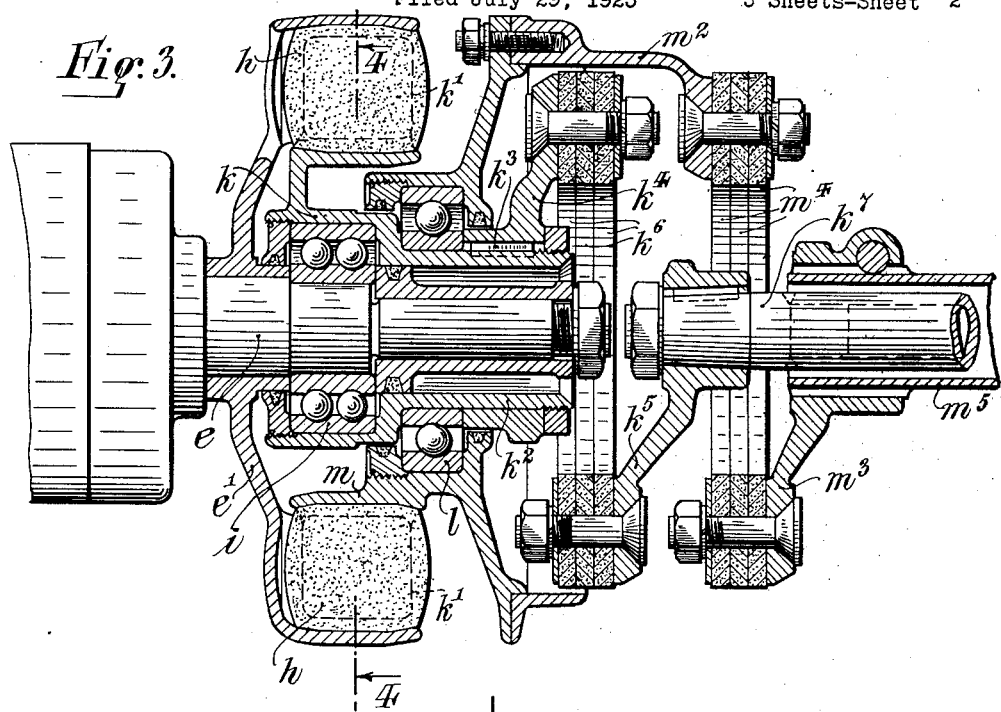
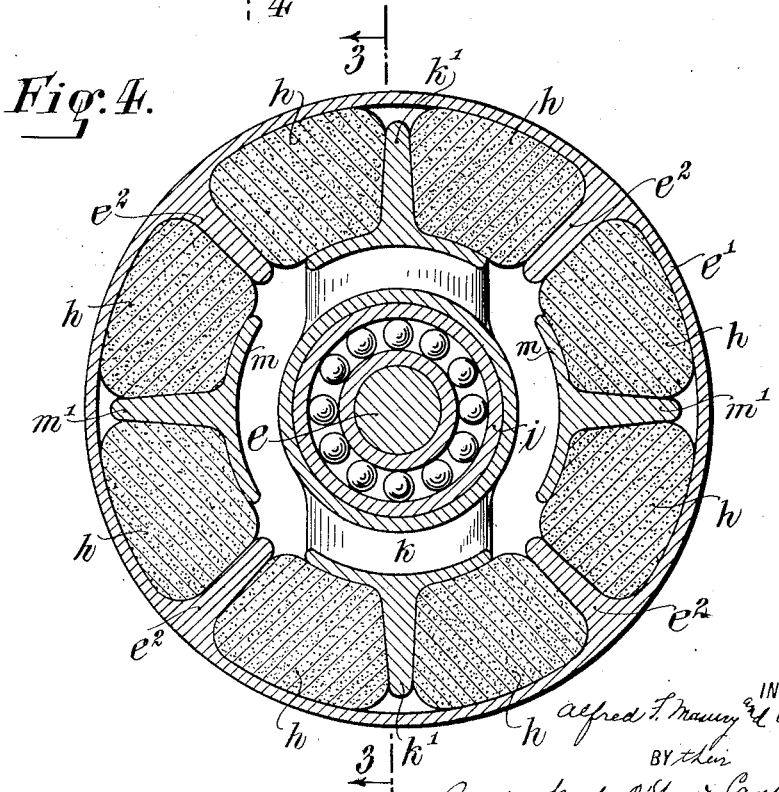

A. F. MASURY ET AL 1,682,299

MULTIWHEEL DRIVE FOR VEHICLES

Filed July 29, 1925    5 Sheets-Sheet 4

INVENTORS
Alfred F. Masury 2nd Charles Frosch
BY their
Redding, Greeley, O'Shea & Campbell
ATTORNEYS

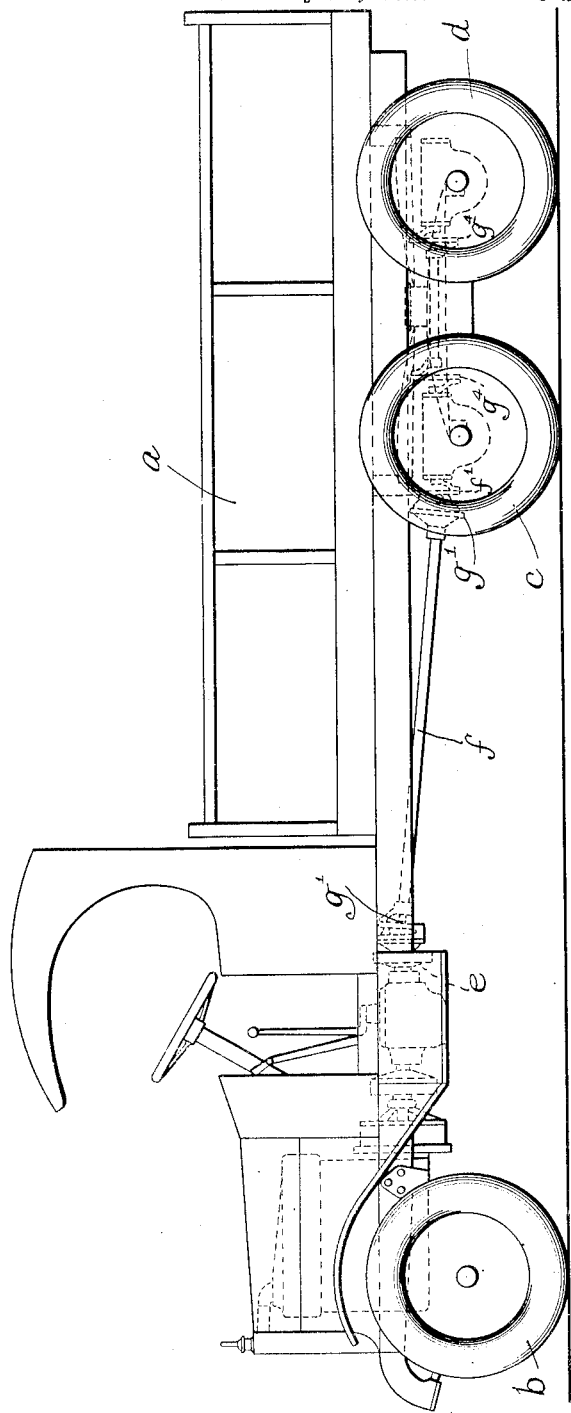

Patented Aug. 28, 1928.

1,682,299

UNITED STATES PATENT OFFICE.

ALFRED F. MASURY AND CHARLES FROESCH, OF NEW YORK, N. Y., ASSIGNORS TO INTERNATIONAL MOTOR COMPANY, OF NEW YORK, N. Y., A CORPORATION OF DELAWARE.

MULTIWHEEL DRIVE FOR VEHICLES.

Application filed July 29, 1925. Serial No. 46,695.

Drives for multi-wheel vehicles have been proposed in the past wherein, in addition to provision for differential movement between jack shafts of a pair, there has been provision for differential movement between a plurality of pairs of such shafts. The differential movement in each instance has been afforded by conventional differential means of a mechanical nature. Inflexibility in the drive has been a characteristic of such mechanical differential devices so that while there has been an apportionment of power between different shafts there has been no provision for what might be termed and impositive or cushioned driving connection therebetween to the end that strains and stresses might be absorbed both in driving and in braking, and expensive and troublesome mechanical units might be eliminated. By the present improvements in multi-wheel vehicle drives it is sought for the first time to retain some apportionment of power between interrelated shafts to such a degree as might be helpful without necessitating the provision of complete differentiating driving connections therebetween, and, further, to incorporate directly within such improved interdriving connections cushioning elements to absorb strains and stresses and minimize vibrations. The principle lends itself to wide adaptation, not being confined to use in vehicles having any predetermined number of driving wheels. Moreover, in such service the particular disposal of driving parts with relation to one another and to other parts of the vehicle may be varied as desired, since the improved means may be placed in the transmission line at any convenient point, that is to say, either ahead of one of a pair of interconnected driving axles, in between such driving axles or behind the other of the pair. Other objects of the invention and permissible variations in the embodiment thereof will be more apparent as the description proceeds reference now to be had to the accompanying drawings for a detailed description of two embodiments, wherein:

Figure 1 is a view in side elevation of a six wheeled motor vehicle in which two pairs of driving wheels are provided at the rear end, one pair of non-driven steering wheels at the front.

Figure 2 is a fragmentary view in plan showing the power transmitting shafting and the general relationship of parts.

Figure 3 is a detailed view in section through line 3—3 of Figure 4 and on a larger scale showing the approved power apportioning and cushioning device between both power transmitting shafts.

Figure 4 is a transverse sectional view through Figure 3 and taken on the plane of line 4—4 of Figure 3 and looking in the direction of the arrows.

Figure 9 shows the invention applied to vehicles of the commercial type.

Figure 5:
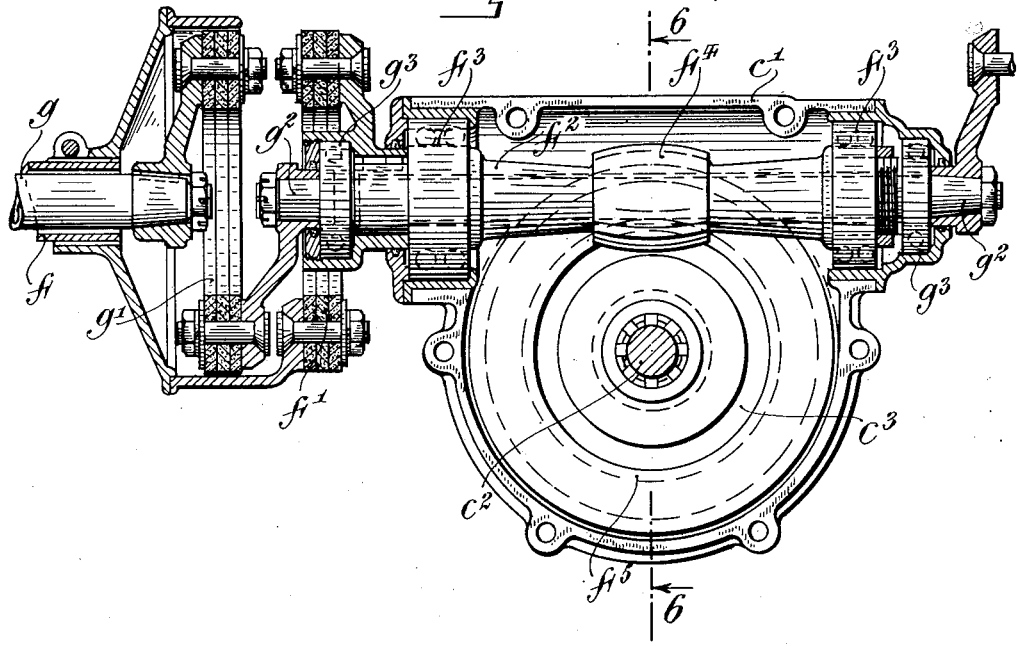
Figure 5 is a detailed sectional view through the foremost of the driven axles and showing the means by which its pair of jack shafts is driven while power is carried rearwardly to the rearmost axle.

As indicated hereinbefore the improvements herein are equally applicable by one skilled in the art to motor vehicles having four or more driven wheels, in multiples of two and regardless of the number of steering wheels and other features such as the particular form of gearing and the like employed to practice the improvements. The simplest proposal is illustrated in Figure 1 wherein the motor vehicle $a$ of conventional form is provided with a pair of steering wheels $b$ at its forward end and two pairs of driven wheels $c, d$, at the rear end mounted, respectively, on dead axles $c', d'$. Each of the dead axles will have mounted therein pairs of live jack shafts $c^2, d^2$, connected with the respective wheels and capable, respectively, of differential motion by virtue of driving differential gears $c^3, d^3$, one of which $c^3$ is shown more particularly in its relation to the jack shafts $c^2$ in Figures 5 and 6. Under certain conditions of operation it will be understood not only do the wheels $c$ and $d$, respectively, have relative differential movement but a degree of relative movement between the respective pairs of wheels is desirable so that there may be in a sense an apportionment of power therebetween depending upon the working conditions at the moment. In other words, the driving force to be delivered by the propeller shaft indicated at $e$ should be divided between the two pairs of driving axles with capacity for apportionment of power and the absorption of stresses and strains in driving and braking. A division of power itself might be obtained through mechanical differential means but such a division is inflexible, non-yielding and carries the elaborate and expensive complications of any such differentiating device. By the improvements herein it is intended to achieve the desired ends by means which are simple, positive in operation, inexpensive and accessible and which while affording the necessary degree of relative angular motion between interrelated shafting is of a yielding character to cushion the parts. Generally speaking, having reference to Figures 1 and 2 it is proposed to connect the propeller shaft $e$ through yielding non-metallic means to two driving shafts $f$, $g$, disposed in telescopic relation, the outer shaft $f$ being intended for connection with the jack shaft $c^2$ of the intermediate axle while the inner shaft $g$ is adapted for driving connection with the jack shafts $d^2$ of the rearmost axle. Immediately associated with the power dividing means, which will be described in greater detail hereinafter, are means affording universal movement so that the transmission line may change direction and, if necessary, independent universal joints of any suitable form and indicated at $g'$, $f'$, may be disposed at another part of the respective shafts $f$, $g$, to change the direction of the power transmission again.

Reference is now to be had to Figures 3 and 4 for a detailed description of one practical embodiment of the improved power dividing and cushioning devices. On the propeller shaft $e$ is splined a spider $e'$ carrying seats or flanges $e^2$ shown as extending radially. These seats $e^2$, four in number, receive masses $h$ of non-metallic yielding material such as rubber. On the shaft $e$ is supported by means of a bearing $i$, a spider $k$ on which are supported seats $k'$ disposed in such relation to the first named seats $e^2$ as to accommodate certain of the masses $h$ of known metallic material and complement the support therefor afforded by said first named seats. The spider $k$ may have a circular elongated hub $k^2$ extending rearwardly to which is keyed as $k^3$ one member $k^4$ of a conventional universal joint the other member $k^5$ being connected thereto as through flexible fabric disks $k^6$ and itself being connected with a rearwardly extending drive shaft $k^7$. On the circular hub $k^2$ of the spider $k$ is journaled as by a bearing $l$ a concentric circular spider $m$ carrying seats $m'$ adapted to be disposed between the seats $e^2$ first described herein but for accommodation of other blocks $h$ under compression than those accommodated by the seats $k'$.

The spider $m$ carries a circular casing $m^2$ encircling the first described universal joint $k^6$ which casing itself constitutes one element of a universal joint and is connected to a second element $m^3$ as through flexible fabric $m^4$, the other member $m^3$ being secured to a rearwardly extending tubular power shaft $m^5$ which is in telescopic relation to the power shaft $k^7$.

Figure 6:
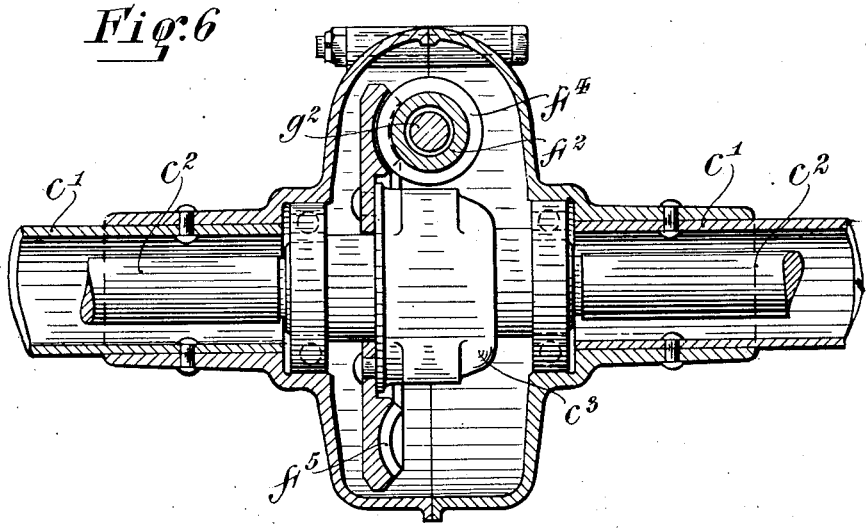
Figure 6 is a view in vertical section through the axle shown in Figure 5 and taken on the plane indicated by the line 6—6 of Figure 5 and looking in the direction of the arrows.

The action of the parts described should now be clear. Power from the propeller shaft $e$ of the vehicle is divided. Part of it is transmitted from the spider $e'$ through certain of the non-metallic yielding blocks $h$ to the seats $k'$ of the spider $k$ and from thence is transmitted through a universal joint $k^6$ (when the direction is to be changed) to a shaft $k^7$. The other portion of the power passing through the spider $e'$ is impressed through the yielding blocks $h$ onto the seats $m'$ of the concentric spider $m$ from whence it is delivered through a universal joint $m^4$ to the tubular shaft $m^5$. Figure 5 shows one convenient assembly for delivering the power from the shafts $f$, $g$, to the respective sets of jack shafts $d^2$, $c^2$. If universal couplings are required the shaft $g$ may be connected through a fabric coupling $g'$ to a rearwardly extending shaft section $g^2$ by which power is ultimately delivered to the differential gear $d^3$ in the rearmost axle. Similarly, the power from the shaft $f$ may be delivered through the universal joint $f'$ to a tubular shaft $f^2$ through which the first named shaft section $g^2$ extends. The tubular shaft $f^2$ may be journaled within the dead axle $c'$ by bearings $f^3$ while separate bearings $g^3$ are provided for the shaft section $g^2$. A worm gear indicated conventionally at $f^4$ is carried on the tubular shaft $f^2$ and meshes with a side worm wheel $f^5$ on the housing of the differential $c^3$ by which the jack shafts $c^2$ are driven in a manner well known. It will be noted that specifically the use of a side worm wheel at this point is important so that road clearances will be maintained at a maximum while the line shafting is kept centered.

The shaft section $g^2$ is carried rearwardly to deliver power to the differential gear $d^3$ through any suitable connections preferably including suitable universal joints $g^4$.

The entire assembly is such as to permit one pair of jack shafts to over-run the other although they are interconnected for maintenance of a definite driving relation. The cushioning blocks $h$ yield sufficiently to permit one shaft $f$ to over-run the other where different driving conditions are encountered by the respective pairs of jack shafts and yet the energy stored incidentally to such differential movement between such shafts may be subsequently restored by the blocks when the normal driving conditions are again set up. The interconnection afforded through the yielding blocks is of an impositive character so that driving and braking stresses and strains are absorbed to a large degree. The complications and expense of a mechanical differential device are spared.

Figure 7:
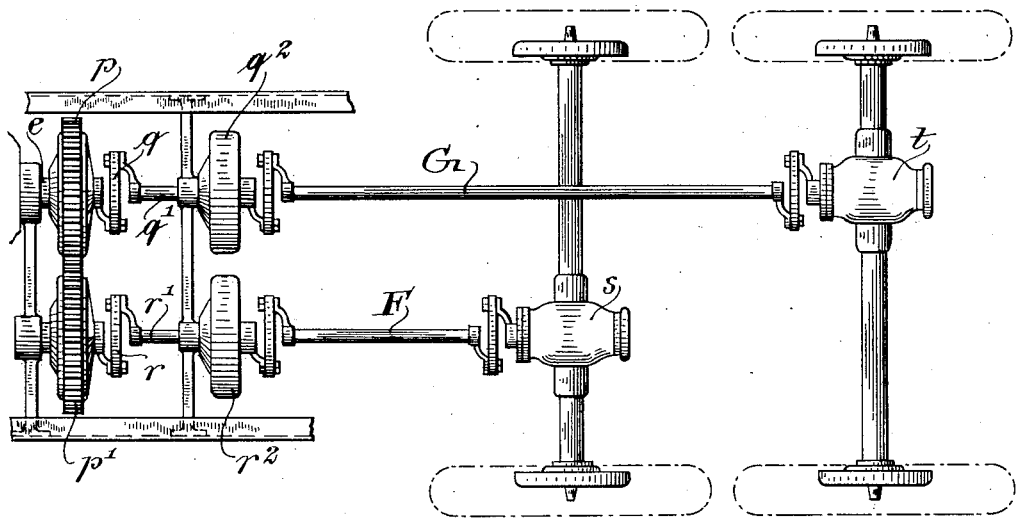
Figure 7 is a view similar to Figure 2 but showing the provision of separate final drive shafts to the two driving axles in place of the telescopic relationship of such shafts illustrated in Figure 2.
Figure 8:
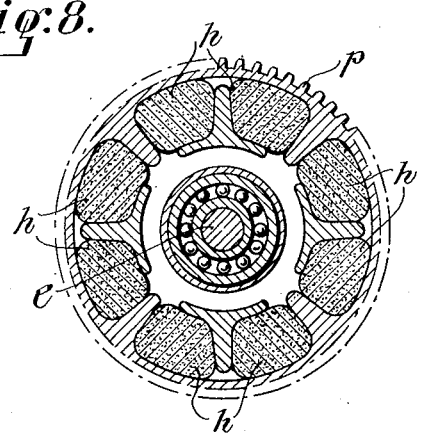
Figure 8 is a sectional view of a part of the apportioning means shown in Figure 7.

The embodiment shown in Figure 7 differs from that heretofore described in two respects. First, the power divided from the propeller shaft $e$ is carried rearwardly to the respective axles through shafting F, G, which is in parallelism but wholly independent therein in telescopic relation and second, two sets of cushioning driving elements such as $h$ are interposed between the propeller shaft $e$ and the respective final drives. As shown in Figure 7 it is proposed that one of the driven spider elements shall carry a spur gear $p$ while the other driven spider element shall be connected through a universal joint $q$ to a rearwardly extending shaft section $q'$. The spur gear $p$ driving second spur gear $p'$ which itself becomes a driving member through yielding elements of a universal joint $r$ which transmits power to a rearwardly extending shaft section $r'$. Further cushioning of the power transmitted through the rearwardly extending parallel shaft sections $q', r'$, may be obtained by introducing in such shafting similar cushioning drive members shown conventionally at $q^2, r^2$, the driven members therein being connected to the respective final drive shafts G, F, by which power is delivered to the differential gears shown conventionally at $s$ and $t$, respectively, in the intermediate and rearmost driving axles.

From the statements herein it will be evident that the invention is not limited in respect of the nature of the motor vehicle in which it is to be incorporated nor in respect of the details of construction for transmitting the driving forces through the cushioning elements. It should also be clear that the particular point of incorporating the power dividing units in the power transmitting line may be changed according to the nature of the drive. For instance, wheels at the forward end of the vehicle as well as wheels at the rear end of the vehicle may be driven in which power shafts may extend forwardly of the vehicle as well as rearwardly. Further, the power dividing units may be disposed equally well between two driving axles instead of forwardly thereof as illustrated or may be disposed rearwardly of both of said axles instead of forwardly.

What we claim is:

1. In a vehicle, a plurality of pairs of driving wheels, means mounted concentrically with respect to each other for driving individual pairs and means for equalizing the force applied through the respective driving means to the several pairs, the equalizing means including a spider with projecting flanges mounted on the propeller shaft, cooperating means including a member connected with another driving shaft and bearing flanges which project between the first named flanges and resilient means between the respective flanges to equalize the power transmission.

2. In a means for driving and equalizing the power transmitted to two concentric driving shafts, a disc with a cylindrical outer flange mounted on the propeller shaft, radial flanges projecting inwardly from the circumferential flange, a cooperating spider mounted on the outer shaft and provided with radial flanges projecting outwardly and adapted to extend between the inwardly projecting flanges whereby seats are formed, and a resilient cushioning means disposed between the flanges of the respective members, whereby inequalities of transmission between the two shafts may be absorbed.

3. In a transmission for a dual drive, a stubbed end propeller shaft, a pair of concentrically mounted driving shafts and means to transmit power to the driving shafts, comprising a disc mounted on the propeller shaft and provided with circumferentially spaced seats, a collar on the stubbed end of the propeller shaft and provided with an annular portion at one end having seats cooperating with certain of the first named seats, a flexible and resilient cushioning means between the respective seats of the members, a connecting member of a universal joint on the other end of the collar and driving the inner drive shaft through a universal joint, a sleeve rotatably mounted over the collar and having flanges forming other cooperating seats with the first named seats, cushioning means between the seats, a connection mounted outside the first differential to a second similar one and driving the outer drive shaft through a second differential joint.

4. In a means for driving and equalizing the power transmitted to two concentric driving shafts, a disc with a cylindrical outer flange mounted on the propeller shaft, radial flanges projecting inwardly from the circumferential flange, a collar and sleeve mounted on the stubbed end of the propeller shaft and rotatable with respect to each other and having radial flanges projecting outwardly alternately in the same plane forming alternate seats to cooperate with the first named flanges and cushioning means mounted between the first named and each of the last named flanges, whereby power transmitted through the collar and sleeve will be equalized.

5. In a power apportioning means, a source of power including a shaft driven thereby, a plurality of driven members receiving divided power from the shaft, and yielding resilient means positioned between the source and driven members for apportioning power from the source between the driven members differentially, said apportioning means comprising a single unit.

6. In a vehicle, a main drive, a plurality of pairs of driving wheels, individual driving means for each pair, a non-metallic and resilient apportioning means interposed operatively between the pairs, and means connecting the apportioning means to the main drive and individual drives of each pair for apportioning power yieldingly from the driving means to the independent and parallel paths constituting the individual driving means for each pair, said apportioning means comprising a single unit.

7. In a vehicle, a plurality of pairs of driving wheels, a main drive, means mounted concentrically with respect to each other and carried with the pairs of wheels for driving individual pairs, flexible non-metallic resilient means for equalizing the force applied through the respective driving means to the several pairs, and means connecting the equalizing means to the main drive and to the respective concentric means for driving the individual pairs.

This specification signed this 17th day of July, A. D. 1925.

ALFRED F. MASURY.
CHARLES FROESCH.